Oct. 2, 1956 L. M. AARON 2,765,275
FILTERING MEANS FOR AQUARIUM WATER
Filed Oct. 11, 1952 2 Sheets-Sheet 1
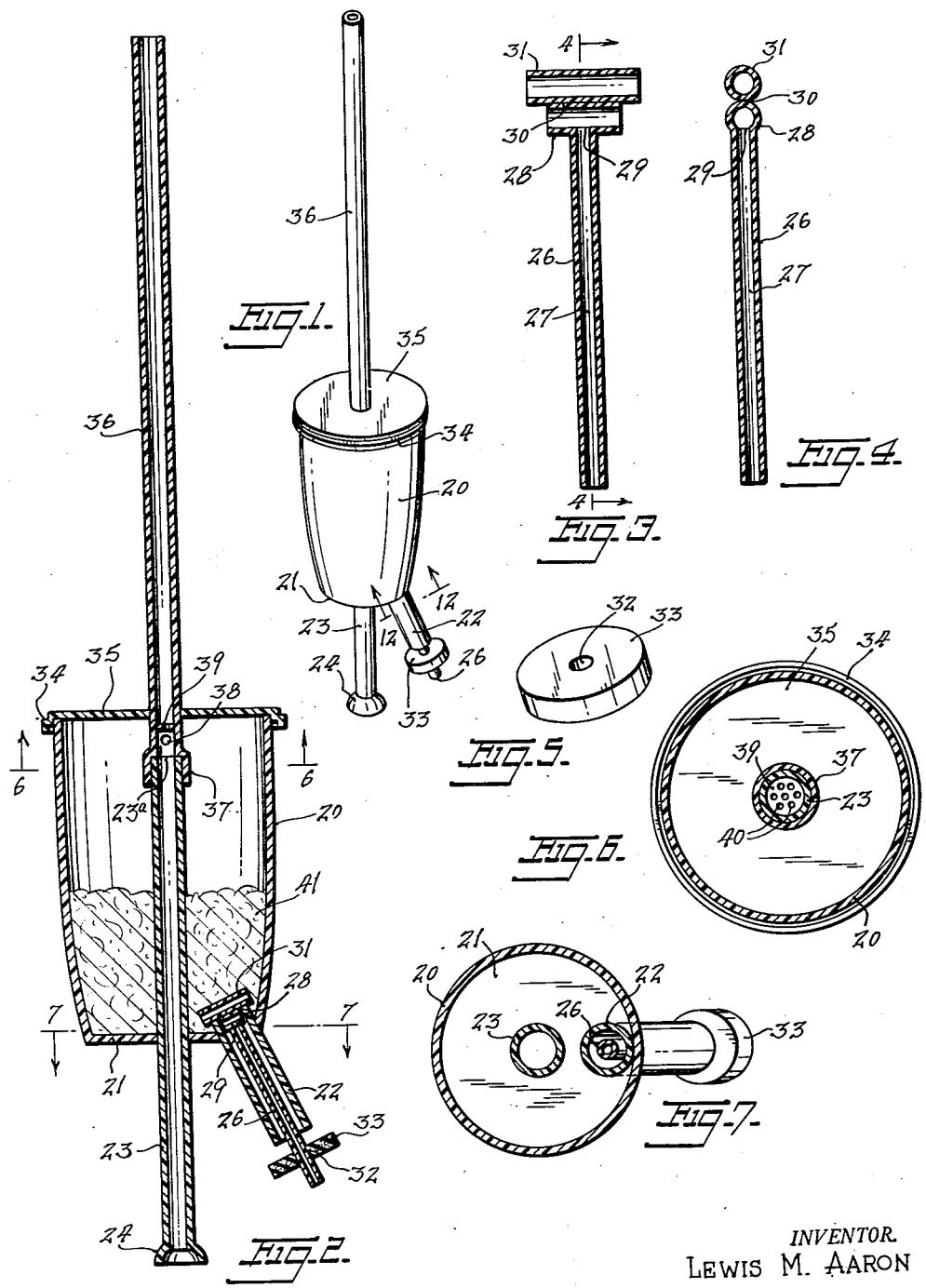
INVENTOR.
LEWIS M. AARON

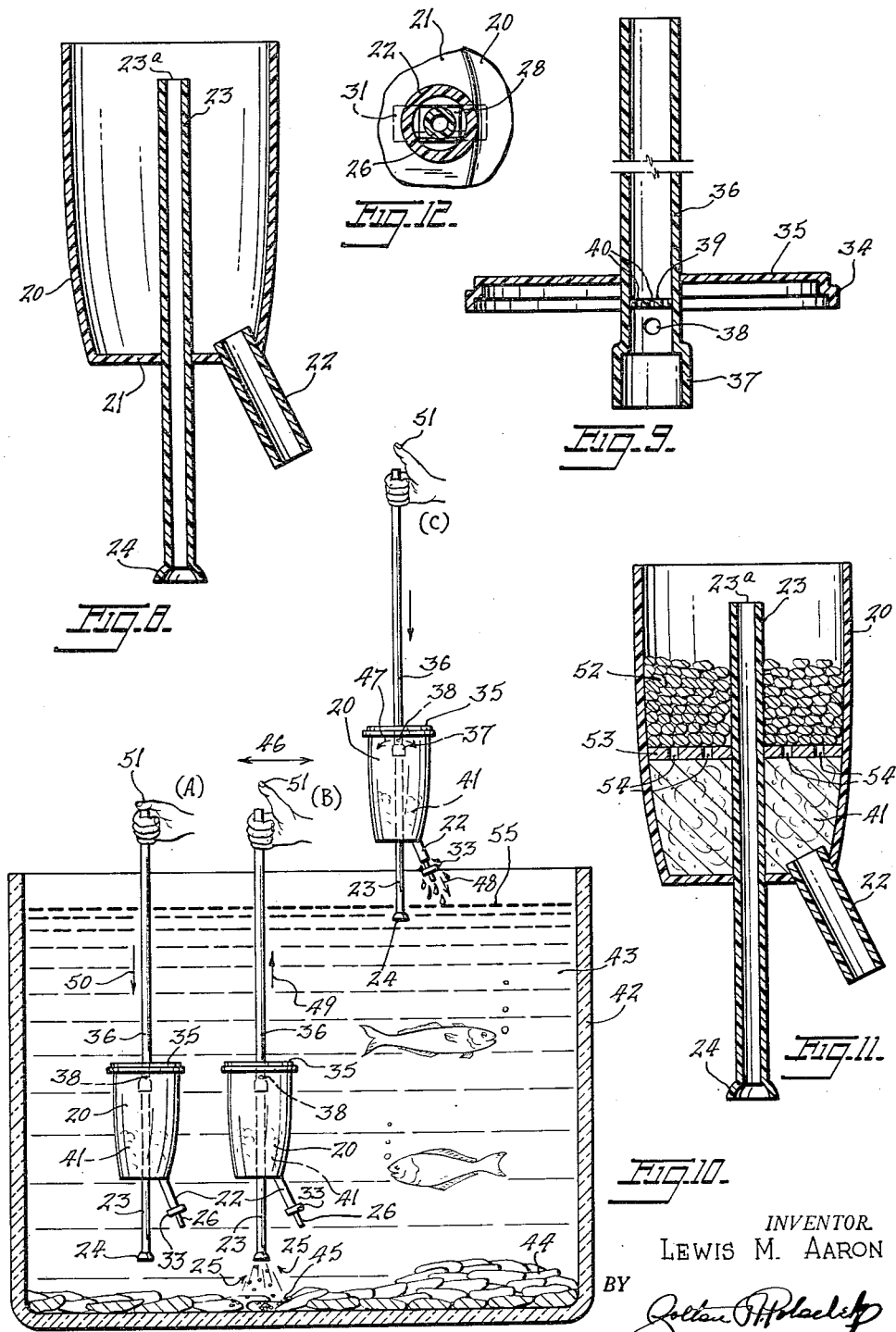

United States Patent Office 2,765,275
Patented Oct. 2, 1956

2,765,275

FILTERING MEANS FOR AQUARIUM WATER

Lewis M. Aaron, Brooklyn, N. Y.

Application October 11, 1952, Serial No. 314,347

6 Claims. (Cl. 210—16)

This application relates to filtering and aerating means for aquarium water and particularly relates to portable type water purification devices.

In the art of water treating means for aquarium water it is known to use devices equipped with pumps, fresh water and air supply sources and other complex arrangements to filter and aerate the water. Such devices are usually permanently attached to aquarium tanks, require plumbing and electrical attachments and are generally expensive to install and maintain. It has been found that it is not only possible but even desirable to leave fish for extended periods in the same aquarium water. The fish become accustomed to the chemical and physical constituents and the micro organisms in the water. The constant removal and replacement of water by conventional methods often causes thermal shocks to fish. Furthermore the chemical, physical and biological instability of the water prevents the fish from acclimating themselves to their environment and adversely affects them physically. However it is necessary at times to clean and periodically aerate the aquarium water. This is accomplished by the present invention in a quick and convenient manner without undue disturbance to the environment of the fish.

It is a principal object of the present invention to provide a device which is simple in construction, simple to operate and wholly portable for cleaning filtering and aerating aquarium water without permanently removing any water from the aquarium.

It is a further object to provide a water purifier having a dip tube and an associated filter chamber for purifying and aerating water.

It is a further object to provide a filter means which removes undesired substances from aquarium water but which returns to the water the bacterial and infusorial forms of life so essential to the well being of aquarium fish.

It is a further object to provide means for removing carbon dioxide and other harmful gases from aquarium water.

For further comprehension of the invention and of the objects and advantages thereof, reference will be had to the following description and accompanying drawings and to the appended claims in which the various novel features of the invention are more particularly set forth.

In the accompanying drawings forming a material part of the disclosure:

Fig. 1 is a perspective view of the device embodying the invention.

Fig. 2 is a vertical sectional view of the device of Fig. 1.

Fig. 3 is a vertical sectional view of the tubular valve insert of the device.

Fig. 4 is a sectional view taken on lines 4—4 of Fig. 3.

Fig. 5 is a perspective view of the valve plug member of the device.

Fig. 6 is a sectional view taken on lines 6—6 of Fig. 2.

Fig. 7 is a sectional view taken on lines 7—7 of Fig. 2.

Fig. 8 is a vertical sectional view of the lower portion of the filter housing.

Fig. 9 is a vertical sectional view of the upper tubular portion of the device with filter housing cover.

Fig. 10 is a diagram showing the manner of operation of the device.

Fig. 11 is a vertical sectional view of the lower portion of the filter housing with diverse type filter materials in the housing.

Fig. 12 is a fragmentary sectional view taken on lines 12—12 of Fig. 1.

In Figs. 1 to 12 of the drawings the device comprises a lower bowl shaped portion 20 open at the top and having two apertures at the bottom 21 through which project the tubes 22 and 23. Tube 23 extends out through the center of the bottom 21 a relatively short distance and flares outwardly at its lower end 24. The tube 23 extends into bowl 20 substantially the entire length of the bowl with its end 23$^a$ lying a short distance below the top of the bowl. The tube 22 is disposed rather obliquely to the central axis of the bowl 20 and extends a slight distance into the bottom of the bowl and extends downwardly from the bottom a lesser vertical distance than does the tube 23. A tubular member 26 is loosely fitted in tube 22. To the open top of tube 26 is attached a short tube 28 perpendicularly disposed to tube 26. Tube 28 has a length slightly less than the diameter of tube 22. A passage 27 extends through tube 26, through aperture 29 in tube 28, and through tube 28 to the open ends of tube 28. Attached to tube 28 by a suitable adhesive 30 or similar fastening means is a tube 31 equal in diameter to tubes 26 and 28 but slightly longer than the diameter of tube 22 (see Fig. 12). Tube 26 is somewhat longer than tube 22 and extends out of tube 22 and through aperture 32 in a sponge rubber plug or washer 33 having a diameter exceeding that of tube 22.

As thus assembled the tubes 26, 28 and 31 constitute valve members in tube 22 limited in movement at one end by tube 31 and at the other end by plug 33.

Other types of valves may, of course, also be used. When the valve is in the position shown in Fig. 2, the end of tube 31 rests on the top end of tube 22 and plug 33 is slightly spaced from the lower end of tube 22 so that air can freely enter tube 26 through the bottom end and leave through aperture 29 and tube 28 to enter bowl 20.

In bowl 20 surrounding tube 23 is a quantity of fiber glass wool 41 which serves as a filter element. The bowl is covered by circular cover 35 which has a rim 34 that snaps tightly over the top of bowl 20. A long tube 36 is mounted on cover 35 passing downwardly through the center thereof a short distance. At the lower end of tube 36 is a widened portion 37 which fits snugly on the end 23$^a$ of tube 23. An aperture 38 is located in the lower end of tube 36 and a disc 29 having a plurality of air apertures 40 is mounted immediately above aperture 38 in tube 36. The size and number of these air openings may be changed as desired.

It is preferable that the various tubes and bowl elements be formed of transparent or translucent plastic although the various parts could be made of glass or other suitable material.

The parts of the device are assembled as shown in Fig. 2 with cover 35 firmly fitted to bowl 20 and tube 36 attached to tube 23. The fibrous filter material 41 fills the space in the lower portion of bowl 20. The use of glass wool is particularly desirable since this material is non-adsorbent and long lasting. Furthermore it remains resilient and resists matting down into a solid mass. As a result the numerous interstices between the fibers are and remain sufficiently small to trap even very small particles which it is desired to remove from the water but are not so small as to trap the micro-organisms which it is desired to return to the water unharmed.

When the aquarium is occupied by a large number of fish it is desirable to remove carbon dioxide and other harmful gases from the water in addition to dirt and other substances.

Although the device as above described will operate to aerate the water, the water may be further degased of ammonia and carbon dioxide, and undesired acids such as carbonic acid and uric acid may be removed, by employing the adsorbing qualities of substances such as charcoal in granular form. In Fig. 11, a quantity of granular charcoal 52 is shown supported on a removable grid 53 having perforations 54. The grid is supported by the inwardly tapering walls of bowl 20 and does not rest on the fibrous wool 41.

The manner of operation of the device is illustrated in Fig. 10. At position (A) the operator has first closed the top opening of tube 36 with his thumb (51) and inserted the device as shown by arrow 50 into the water 43 of a tank 42. As the device enters the water, water pressure and the inherent buoyancy of sponge rubber plug 33 raise plug 33 to close the lower opening of tube 22. The flared end 24 of tube 23 is placed adjacent the gravel 44 in the bottom of the tank. At position (B) the operator removes his thumb from the opening to tube 36 and water rises in tube 23 and passes through aperture 38 into bowl 20, filling said bowl, and through apertures 40 into tube 36, rising in said latter tube as shown by arrows 49 to the surface level 55 of the water. The air in bowl 20 will be evacuated through the apertures 38 and 40 and tube 36. The operator moves the device around the tank as shown by arrows 46 among the debris and other substances 45 it is desired to remove from the tank. The water carrying the debris and other substances enters the flared end 24 of tube 23 as shown by arrows 25. When the water in tube 36 reaches level 55 the operator raises the device until the tubes 22 and 26 are out of the water as shown in position (C).

It is preferable that the flared end 24 of tube 33 remain submerged in the water 43. When the device is thus elevated the water slowly descends tube 36 being limited by the small apertures 40 in disc 39, and the slow rate of entry of air into the lower end of tube 26. Air can enter tube 26 because plug 33 descends slightly when tube 26 is raised out of the water. The water descending tube 36 is emitted via aperture 38 as shown by arrows 47 upon the filter material 41. During seepage of the water through the filter material debris and other particles are trapped while the filtered cleaned water drips through and out of tube 22 as shown by arrow 48. In passing through the air the dripping water is aerated.

By the construction and manner of operation above described it is possible to clean selected portions of an aquarium tank at will. All undesired debris and particles are removed from the water while the "seasoned" water is returned cleaned and aerated to the aquarium. The device operates without requiring use of external power, compressed air, water supply, or drain. The device is easily cleaned after use and is simple and easy to use. It is relatively inexpensive in comparison to conventional filtering devices employing complex mechanical systems permanently attached to aquarium tanks.

In this device the tube 36 may also be made integral with the cover 35 to supply air into the bowl 20 and thus the wide portion 37 of tube 36 may be eliminated.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention what I claim as new and desire to secure by United States Letters Patent is:

1. An aquarium filter device comprising a closed housing, a tube passing through said housing and extending out from opposite ends thereof, a filter medium in said housing surrounding the tube, said tube being provided with an aperture in the wall thereof adjacent the filter medium and another tube separately spaced from said first tube and extending from the bottom of said housing, and provided with slidable valve means extending below and opening into the housing, said valve means including a buoyant plug for closing the valve opening.

2. A device for cleaning, filtering, and aerating aquarium water comprising a closed, substantially cylindrical housing, a tube passing through said housing and extending from opposite ends thereof, a filter medium in said housing surrounding the tube, said tube being provided with an aperture in the wall thereof adjacent one inner end of the housing, a perforated disc mounted in an upper portion of the tube, above and adjacent the aperture, and another tube separately spaced from said first tube and extending from the bottom of said housing and provided with slidable valve means extending below and opening into the housing, said valve means including a buoyant plug for closing the valve opening.

3. A device for filtering aquarium water comprising a substantially cylindrical bowl, a cover adapted for snugly fitting on the bowl, a first elongated tube extending through the bottom of the bowl, a second elongated tube separately spaced from said first tube and extending through the cover, the upper end of the first tube and the lower end of the second tube being adapted for joining together, a filter medium in said housing surrounding the tube, a third tube extending through the bottom of the bowl said second tube being provided with an aperture in the wall thereof, adjacent the lower end thereof, said third tube being provided with slidable valve means extending below and opening into the housing, said valve means including a buoyant plug for closing the valve opening.

4. A water cleaning and filtering device comprising a substantially cylindrical bowl, filter material retained within said bowl, a cover adapted for snugly fitting the top of the bowl, a first tube substantially longer than the bowl extending a short distance through the cover and having an aperture in a side wall adjacent the end thereof, said end being adapted for joining a second tube, said second tube extending from the bottom of the bowl a distance substantially less than the length of the bowl, and a third tube extending from the bottom of the bowl a distance less than the distance of extension of the second tube, said third tube being provided with slidable valve means extending below and opening into the housing, said valve means including a buoyant plug for closing the valve opening.

5. A device in accordance with claim 6, wherein said means disposed at the upper end of said narrow tube comprising a short tube equal in diameter to said narrow tube and shorter in length than the diameter of said third tube, said short tube being attached perpendicularly to said narrow tube at the upper end thereof and having an opening whereby to define a continuous passage from the lower end of said narrow to the ends of said short tube, and another tube longer than the diameter of said third tube, said last mentioned tube coinciding with said short tube and secured thereto.

6. A water cleaning and filtering device comprising a substantially cylindrical bowl, filter material retained within said bowl, a cover adapted for snugly fitting the top of the bowl, a first tube substantially longer than the bowl extending a short distance through the cover and having an aperture in a side wall adjacent the end thereof, said end being adapted for joining a second tube, said second tube extending from the bottom of the bowl a distance substantially less than the length of the bowl, and a third tube extending from the bottom of the bowl a distance less than the distance of extension of the second tube, said third tube being provided with valve means comprising a narrow tube of lesser diameter than said third tube, located within said third tube, a flexible, inherently buoyant plug mounted on the lower end of the said narrow tube for closing the lower end of the third tube, and means disposed at the upper end of said narrow tube retaining the narrow tube within the third tube.

References Cited in the file of this patent

UNITED STATES PATENTS

| | | |
|---|---|---|
| 898,456 | Farnham | Sept. 15, 1908 |
| 1,222,162 | Tinley | Apr. 10, 1917 |
| 2,292,737 | Enderson | Jan. 28, 1919 |
| 2,335,756 | Haldeman | Nov. 30, 1943 |
| 2,456,524 | Meincke | Dec. 14, 1948 |
| 2,494,392 | Kirkbride et al. | Jan. 10, 1950 |